2 Sheets—Sheet 1.
F. W. TOLLEY.
Cultivators.
No. 210,884. Patented Dec. 17, 1878.
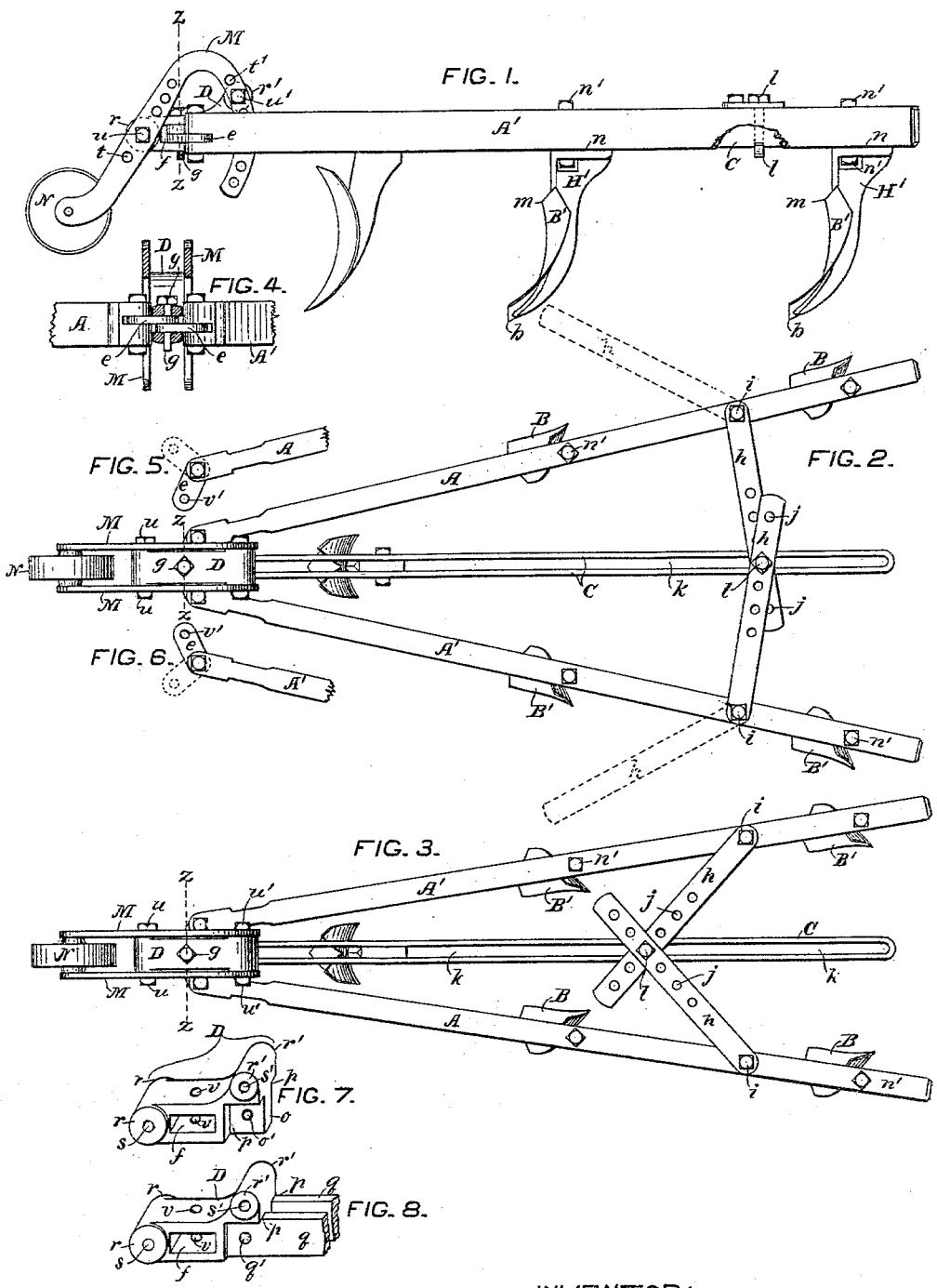
WITNESSES:
James H. Slade.
James T. Goodfellow.
INVENTOR:
Frederick W. Tolley 2 Sheets—Sheet 2.
F. W. TOLLEY.
Cultivators.
No. 210,884.      Patented Dec. 17, 1878.
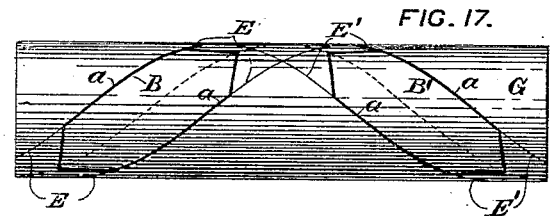
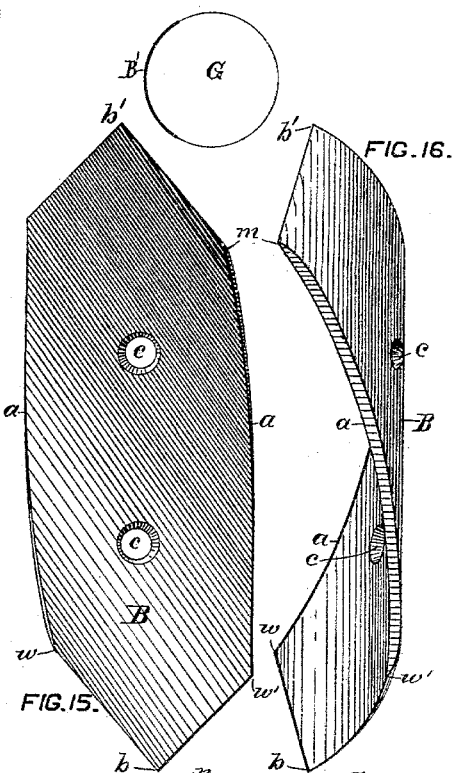
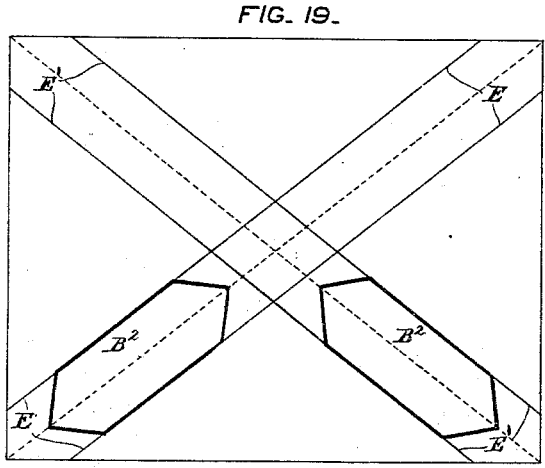
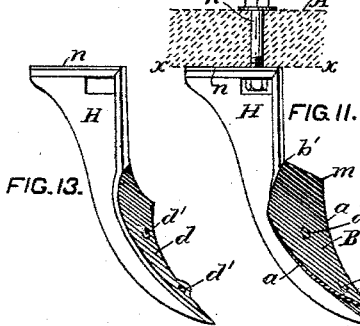
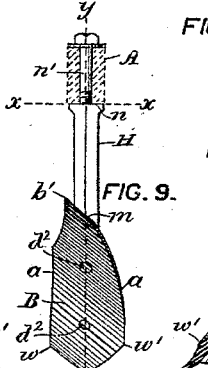
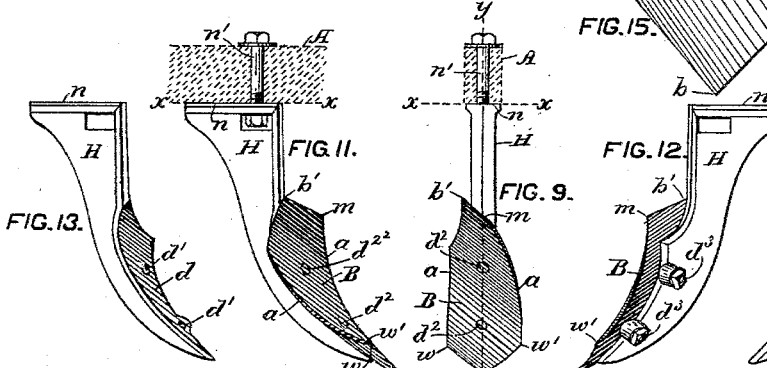
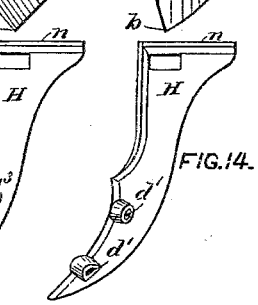
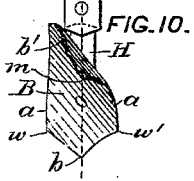
WITNESSES:
James H. Slade,
James T. Goodfellow
INVENTOR:
Frederick W. Tolley
N. PETERS, PHOTO-LITHOGRAPHER, WASHINGTON, D.C.

UNITED STATES PATENT OFFICE.

FREDERICK W. TOLLEY, OF COXSACKIE, NEW YORK, ASSIGNOR OF ONE-THIRD HIS RIGHT TO SAMUEL STEPHENS, OF SAME PLACE.

IMPROVEMENT IN CULTIVATORS.

Specification forming part of Letters Patent No. 210,884, dated December 17, 1878; application filed July 24, 1878.

*To all whom it may concern:*

Be it known that I, FREDERICK W. TOLLEY, of Coxsackie, in the county of Greene and State of New York, have invented certain Improvements in Cultivators, of which the following is a specification, reference being had to the accompanying drawings.

This invention relates to that well-known class of cultivators in which each cultivator has teeth or blades inclined laterally—some to the right and others to the left.

One part of this invention consists of a peculiarly-constructed head-block, hereinafter described, whereby the beam, wings, and holder of the gage-wheel of the cultivator are all conveniently and adjustably connected together by ordinary bolts, as hereinafter set forth.

Another part consists of an improved cultivating-blade of a particular inclined spiral form and construction, as hereinafter described.

Another part consists of the improved blade of peculiar spiral form, in combination with a corresponding standard, to which the blade is secured in a certain inclined position, as hereinafter set forth.

In the aforesaid drawings, Figure 1 is a side elevation of the main portion of a cultivator which embodies all the parts of this invention. Fig. 2 is a plan of the same, with the wings placed so that the inclined blades will turn the soil outward; and Fig. 3 is a plan with the wings adjusted so that the inclined blades shall turn the soil inward. Fig. 4 is a front elevation of the forward end parts of the wings and adjacent parts and of a vertical section at the line $z\ z$ in Figs. 1, 2, and 3. Figs. 5 and 6 are plans of the forward end parts of the two wings. Fig. 7 is a perspective view of the head-block, to which the beam, wings, and holder of the gage-wheel can be or are secured by bolts; and Fig. 8 is a perspective view of the same head-block with the forward portion of the beam fastened thereto. Fig. 9 is a front elevation, Fig. 10 a plan, Fig. 11 an elevation of one side, and Fig. 12 an elevation of the other side, of one of my improved spiral blades arranged and secured according to this invention upon a standard that is adapted to be fastened to the under side of a wing of the cultivator; and Fig. 13 is an elevation of one side, and Fig. 14 an elevation of the other side, of the same standard without the blade. Fig. 15 is a side elevation, and Fig. 16 an edge elevation, on a larger scale, of one of the same spiral blades detached from the standard. Fig. 17 is a side elevation, and Fig. 18 an end elevation, of a cylinder, upon which are represented right and left spiral bands, of which pointed portions represent my improved spiral blades; and Fig. 19 is a plan of the whole surface of the same cylinder made flat, and showing the diagonal positions of the right and left spiral bands on the cylinder and the forms of the blanks from which the improved spiral blades are made.

A A' are two wings, one furnished with blades B, inclined rearward to the right, and the other supplied with similar blades B¹, inclined rearward to the left, and C is an intermediate beam having a head-stock, D, firmly secured thereto. Each wing is furnished with a short link, $e$, which has one end pivoted to the forward end of the wing, so that the link can be turned horizontally on the wing to the right and left, as indicated in Figs. 5 and 6. The other ends of the two links $e\ e$ are detachably pivoted, and thereby secured in a horizontal mortise, $f$, through the beam, or head D thereof, by a removable pin or bolt, $g$, Fig. 4. Each wing A A' also has a brace, $h$, pivoted thereto at $i$, so that the braces can be turned on the wings to the right and left; and each brace $h$ has a vertical perforation, $j$, through which and through a vertical hole or slot, $k$, in the beam C a removable clamping-bolt, $l$, extends and secures the two braces $h\ h$ to the beam C in a detachable manner.

By reason of the above-described construction and combination of parts the cultivator can be quickly adjusted from the condition in Fig. 2, in which the right and left inclined blades B B' will turn the soil outward, into the condition represented in Fig. 3, wherein the same blades will turn the soil inward, and from the latter condition into the former by merely withdrawing the bolts $g$ and $l$, so as to thereby release the links $e\ e$ and braces $h\ h$, and then putting each wing A and A' in the place of the other, and turning the links $e\ e$ and braces

*h h* to the right and left on the wings, and refastening the links in the mortise *f* by the screw *g*, and the braces to the beam by the bolt *l*.

By having lengthwise vertical slots or several holes *j* through the braces *h h*, or several vertical holes or a lengthwise slot, *k*, through the beam C, the wings A A' can, by means of the fastening-bolt *l*, be readily adjusted and secured at various angles in respect to each other, and at different distances apart at their rear ends, while their forward ends remain secured at one and the same constant distance apart to the forward portion or head of the beam C by means of the links *e e* and bolt *g*, whether the wings are set with the blades in position to turn the soil outward, as in Fig. 2, or inward, as in Fig. 3.

In order to produce a cheap and durable device, by means of which the beam C, adjustable holder M of the gage-wheel N, and the forward ends of the wings A A', having the links *e e* pivoted thereto, can all be quickly and durably secured together by ordinary bolts, I construct in one piece of metal the peculiar head-stock D. (Shown separate in Fig. 7.)

The head D has at its lower rear part, and on opposite sides of a vertical plate-like part, *o*, having through it a horizontal bolt-hole, *o'*, two angular recesses, *p p*, into which latter the forward end parts, *q q*, of the beam C fit closely, and have through each a hole coinciding with the hole *o'*, so that the forward end parts of the beam will be or are firmly secured to the head D, as indicated in Fig. 8, by the recesses *p p*, in connection with a rivet or screw-bolt, *q'*, extending through the said coinciding holes, through the part *o*, and forward end parts of the beam. The head also has forward and rear lateral bearings, *r* and *r'*, through which are horizontal bolt-holes *s s'*, corresponding in size and distance apart with holes *t t'* through the holding parts M of the gage-wheel N, so that the parts M, with the wheel journaled therein, will be or are firmly secured to and adjustable into different positions upon the head D by means of screw-bolts *u u'*, extending through the holes *t t'* in the holder M and the holes *s s'* through the head. The head D also has through it the horizontal mortise *f* and vertical bolt-holes *v*, so that the forward end parts of the links *e e*, that are pivoted to the wings A A', can be or are secured in the mortise *f* and pivoted to the head by a pin or bolt, *g*, extending through the holes *v* in the head and the holes *v'* in the links.

Cultivators have been heretofore made with detachable right and left inclined teeth or blades having various curved and twisted concave working-surfaces; but such teeth or blades are, so far as I am aware, imperfect by reason of heavy draft, liability to clog, or defective loosening, turning, and spreading of the soil.

I produce right and left inclined cultivator teeth or blades B and B¹, which are superior in practical use to all others of which I have knowledge, by making the forward working-surfaces of the right and left inclined blades respectively in the continuously-concave spiral shape of the inner surface of pointed one-third portions of right and left spiral bands E E E' E', Fig. 17, each of the width of the blade, and constituting one turn only around the circumference, and from end to end of a cylinder, G, Figs. 17 and 18, whose diameter is substantially one-fourth of its length.

In manufacturing these improved right and left spiral cultivator-blades B B¹, I commonly make them about three and one-half inches, or from three to four inches in width, with parallel side edges *a a* and pointed ends *b b'*, and with their forward surfaces in the shape and of the length from one point, *b*, to the other, *b'*, of about one-third of the inner surface of the right and left spiral bands E E and E' E', respectively, on a cylinder, G, about six inches in diameter and twenty-four inches in length. These blades are to be made of any suitable material; but I commonly prefer to make them of plates of steel, by first cutting flat blanks B², Fig. 19, of the proper size and outline shape, and then heating the blanks and stamping or swaging them separately into the required right and left spiral shapes between suitable dies or forms. I also make two countersunk bolt-holes, *c c*, through each blade at equal distances from the ends, for conveniently fastening the blades, with either end down or up, to suitable standards H H', each having a right or left concave spiral surface, *d*, and bolt-holes $d^1 d^1$ perpendicular thereto, so that the blades can be firmly secured to the standards by suitable bolts $d^2$, extending through the holes *c* and $d^1$ of the blades and standards, and having fastening-nuts $d^3$.

I construct each of the standards H H' with the right or left concave spiral surface *d* thereof inclined rearward, upward, and laterally at a considerable angle, so that when the corresponding right or left blade, B or B¹, shall be secured to and upon the standard by the bolts, the blade shall then incline upward, backward, and laterally from its lower end point, *b*, essentially as shown by Figs. 1, 2, 3, 9, 10, 11, and 12, with the lower point, *b*, and upper corner, *m*, of the blade in a plane, *y y*, Figs. 9 and 10, at, or nearly at, right angles to the plane *x x*, Figs. 9 and 11, of the top *n* of the standard, which is adapted to be fastened by a bolt, *n'*, to and against the under side of the beam or wing of the cultivator, and so that when the standard is thus attached to the beam or wing, the lower end point, *b*, and the upper corner, *m*, of the blade, are in, or nearly in, a vertical plane, *y y*, Figs. 9 and 10, in which the blade moves forward in use.

In Figs. 9, 10, 11, and 15, the straight parallel shade-lines on the continuously-concave spiral working surface of the blade are parallel to the axis of a cylinder, upon the surface of which the concave spiral surface of the blade will continuously fit accurately, and those straight shade-lines in Figs. 9, 10, and 11 indicate the degrees of upward, rearward, and lateral inclination of my improved spiral blades when mounted according to this invention upon standards secured as usual to the beams or wings of a cultivator.

A plate-like cultivator-blade has been heretofore devised of uniform width and in the form of about one-half of a band making one spiral turn around and upon a cylinder, and having at each end only one straight cutting-edge extending entirely across the blade, as specified and shown in United States Letters Patent No. 18,739; but, in my improved cultivator-blade it is necessary that each blade, while being of uniform width, and about three times as long as wide, and in the form of about one-third portion only of a band making just one spiral turn around and from end to end upon a cylinder whose diameter is about one-fourth of its length, as hereinbefore specified, and shown in the drawings, shall also have each end of the blade formed with two oppositely-inclined cutting-edges, in a V shape, with the points $b\ b'$ projecting in the middle, and the cutting-edges making obtuse angles $w\ w'$, Figs. 9, 10, 15, with both side edges of the blade, as shown, whereby my improved blade is adapted, at each end, to penetrate, raise, spread, and turn the soil and cut off and tear out the tough roots of grass and weeds quite differently and far more effectually than if the spiral blade had at each end only one straight cutting-edge extending entirely across the blade, or than if the blade had the form of about one-half of a band making one spiral turn around a cylinder.

Plate-like cultivator-blades have been heretofore made each with parallel sides and a V-shaped cutting-edge at each end; but such blades did not embody the combination of the V-shaped cutting end edges and the hereinbefore-specified particular spiral form and proportion of parts essential to my improved cultivator-blade.

Plows have been heretofore made with a mold-board in the form of a spiral segment of a hollow cylinder; but I am not aware that such mold-boards have been of uniform width from end to end, with each end in the form of a V-shaped cutting-edge having the point in the middle of the end.

Cultivator-blades heretofore devised in the form of a segment of a band making a spiral turn upon a cylinder, and having a single straight cutting-edge across the blade at each end, have each been arranged and secured upon a standard in a cultivator so that the axis of the spiral working-surface of the blade and all straight lines that could be drawn in that surface were horizontal, or nearly horizontal, while being inclined rearward and laterally; but my improved combined spiral blade and standard in a cultivator requires that the axis of the spiral working surface of the blade and of the spiral surface $d$ of the standard, and all straight lines that can be drawn in those surfaces, shall be not horizontal, nor nearly horizontal, but greatly inclined upward, as well as laterally and rearwardly, as indicated by the straight lines on those spiral surfaces in Figs. 9, 10, 11, and 13, while the middle lower point, $b$, and the upper side corner, $m$, are in, or nearly in, the vertical plane in which the blade is drawn forward in use, as indicated by the lines $y\ y$ in Figs. 9 and 10, whereby the blade is rendered more effective in cutting into, elevating, and loosening the soil, while turning it mainly to one side, than would be the case if the blade and standard were combined and arranged in a cultivator with the axis of the spiral working surface of the blade horizontal, or nearly horizontal, or with the point $b$ and upper side corner, $m$, of the blade in a vertical plane much inclined to the vertical plane $y\ y$, in which the blade is moved forward in use, or in which the point $b$, corner $m$, and standard-holding bolt $n'$ are all arranged.

What I claim as my invention is—

1. The head-stock D, constructed in one piece, with the horizontal mortise $f$, lateral recesses $p\ p$, vertical plate $o$, front and rear side bearings, $r\ r'$, and bolt-holes $v\ o'$ and $s\ s'$, as shown and described.

2. The improved cultivator-blade having a uniform width about equal to one-third of its length, V-shaped cutting edges at each end with the point in the middle, and the whole in the form of about a third-pointed portion of a band making one spiral turn around and from end to end upon a cylinder having its diameter about one-fourth of its length, as shown and described.

3. In a cultivator, the improved blade having V-shaped cutting end edges and the particular spiral form and proportions specified, in combination with the standard, and secured thereto with all straight lines in the spiral working surface of the blade inclined upward, rearward and laterally, and with the lower middle point, $b$, and the upper side corner, $m$, in a vertical plane, $y\ y$, coincident with that in which the blade is drawn forward in use, as shown and described.

In testimony whereof I hereunto set my hand in the presence of two subscribing witnesses this 22d day of July, 1878.

FREDERICK W. TOLLEY.

Witnesses:
JAMES H. SLADE,
JOHN J. RAFFERTY.